United States Patent [19]
Burrows

[11] 3,849,121
[45] Nov. 19, 1974

[54] ZINC OXIDE RECOVERY PROCESS

[76] Inventor: W. Herbert Burrows, 2518 Boxewood Ct. N.E., Atlanta, Ga. 30345

[22] Filed: Nov. 30, 1971

[21] Appl. No.: 203,462

[52] U.S. Cl............ 75/103, 75/109, 75/117, 75/120, 423/101, 423/103, 423/109, 423/143, 423/150
[51] Int. Cl............................................. C22b 3/00
[58] Field of Search ........... 423/101, 103, 109, 143, 423/150; 75/109, 117, 120, 103

[56] References Cited
UNITED STATES PATENTS

| | | | |
|---|---|---|---|
| 1,184,585 | 5/1916 | Snyder | 75/109 X |
| 2,305,829 | 12/1942 | Prepic | 423/109 |
| 3,193,382 | 7/1965 | Veltman et al. | 423/109 |
| 3,510,414 | 5/1970 | Orlandini et al. | 423/109 X |

*Primary Examiner*—Herbert T. Carter

[57] ABSTRACT

Method for the selective recovery from a number of industrial waste material of various components, including zinc, copper, lead and iron, comprising the steps of leaching the waste material with an ammonium chloride solution maintained at an elevated temperature, separating the undissolved iron component from solution, treating the solution with zinc metal to displace the copper and lead from the solution, and cooling the solution to precipitate therefrom the zinc component as zinc oxide.

10 Claims, No Drawings

ZINC OXIDE RECOVERY PROCESS

BACKGROUND OF THE INVENTION

This invention relates to the recovery of metal components from industrial waste and is more particularly concerned with the method for the recovery of zinc, copper, lead and iron from industrial waste material containing oxides of these metals.

Zinc oxide is found in commercial by-products such as fly ash and electric furnace flue dust. Previous methods of extracting this zinc oxide have included leaching with mineral acid, leaching with caustic soda solution, leaching with ammonium hydroxide solution and leaching with ammonium carbonate solution. Various difficulties were encountered in these methods, however, including low yields of zinc oxide, the recovered zinc oxide being contaminated with other metal salts, the requirement of subsequent roasting procedures, and the costly evaporation processes involved.

SUMMARY OF THE INVENTION

Briefly described, the present invention includes a method for the selective acquisition of various components from various industrial waste material which comprise primarily the oxides of zinc, lead, copper, and iron. The material is digested in a hot 30 percent ammonium chloride solution, followed by settling of the solution and separating the undissolved iron oxide therefrom. While the solution is sufficiently hot so that no crystallization of the dissolved constituents occurs, zinc metal dust is added to the solution to displace by precipitation as metallic lead and copper the copper and lead ions present therein. The resultant solution is allowed to cool and zinc oxide is recovered by crystallization.

It is, therefore, a primary object of this invention to provide a method for the selective recovery from various industrial waste material of various components, such as zinc, copper, lead and iron.

It is another object of this invention to provide a method for the recovery from various industrial waste material of high grade purity, crystalline zinc oxide.

Another object of this invention is to provide a method for the recovery of zinc oxide from various industrial waste material, such as electric furnace flue dust, whereby a leaching solution of ammonium chloride is employed which can be recycled for use in the reclamation of additional amounts of zinc oxide from the waste material.

A still further object of this invention is to provide a method for the recovery of various components of electric furnace flue dust which is cheap, quick and efficient.

DESCRIPTION OF THE INVENTION

Generally, the objects of the invention are achieved by first leaching electric furnace flue dust with a hot ammonium chloride solution.

A typical analysis of a sample of flue dust where the charge contains galvanized steel shows the following percent composition:

TABLE I

ANALYSIS OF ELECTRIC FURNACE FLUE DUST

| | | |
|---|---|---|
| Zinc oxide | | 39.64% |
| Iron oxide | | 36.74% |
| Lead oxide | | 5.72% |
| Inert material (siliceous material, such as slag, with carbon granules occluded) | | 9.10% |
| Minor components: | | 8.58% |
|   Calcium oxide | 2.80% | |
|   Potassium oxide | 2.41% | |
|   Manganese oxide | 1.29% | |
|   Tin oxide | 1.13% | |
|   Aluminum oxide | 0.38% | |
|   Magnesium oxide | 0.33% | |
|   Chromium oxide | 0.13% | |
|   Copper oxide | 0.06% | |
|   Silver | 0.05% | |
| Unidentified (spectrograph shows traces of molybdenum, antimony, indium, cadmium, germanium, bismuth, titanium, nickel and boron) | | 0.22% |
| | Total | 100.00% |

Preferably, it is desirable in this method to obtain the maximum recovery of the zinc oxide component. Therefore, in selecting the best percent concentration by weight of the ammonium chloride solution employed in this process and the best temperature at which to carry out this method, care was taken to insure the optimum recovery of zinc oxide.

Solutions were prepared by dissolving the specific quantities of ammonium chloride in 100 ml. water, then saturating the solutions with zinc oxide at various constant temperature levels. The uniformity of the solution composition was achieved by refluxing the evaporated water and by constant agitation of the solution. At predetermined intervals, aliquots were withdrawn, discharged into a hydrochloric acid solution, heated to boiling and titrated with standard potassium ferrocyanide solution. The results were calculated as weight of zinc oxide dissolved by the 100 ml. of water to which specific amounts of ammonium chloride had been added and are presented in Table II

TABLE II

SOLUBILITY OF ZINC OXIDE IN AMMONIUM CHLORIDE SOLUTIONS

| Solvent Composition (gm $NH_4Cl$/100 ml. $H_2O$) | Temperature (°C) | | | | | |
|---|---|---|---|---|---|---|
| | 20 | 40 | 60 | 70 | 80 | 90 |
| | (solubility = gm. ZnO/100 ml.$H_2O$) | | | | | |
| 10 | 0.4 | 0.7 | 1.3 | — | 1.8 | — |
| 15 | 0.8 | 1.6 | 2.6 | — | 3.5 | — |
| 20 | 0.8 | 1.6 | 4.6 | — | 7.5 | — |
| 25 | 1.2 | 2.5 | 6.0 | 10.2 | 11.0 | 11.6 |
| 30 | 1.0 | 2.3 | 5.0 | 8.4 | 13.2 | 14.6 |

It is apparent from the above table that a 30 percent solution of ammonium chloride provides the steepest solubility versus temperature curve. Therefore, were flue dust to be leached with hot (90°C or higher) 30 percent ammonium chloride solution, the quantity of flue dust taken being sufficient to provide approximately 14.6 grams of zinc oxide per 100 ml. of ammonium chloride solution, and were the solution of zinc oxide thus obtained to be subsequently cooled to a temperature of 20°C, one should expect that approximately 13.6 grams of zinc oxide would be precipitated therefrom, and that approximately 1.0 gram of zinc oxide would remain in the solution. Further, one might expect that said solution containing approximately 1.0 gram of zinc oxide might be reheated to 90°C or higher and mixed and stirred with sufficient flue dust to provide approximately 13.6 grams of zinc oxide, that the 13.6 grams of zinc oxide would dissolve in said solution, and that upon subsequent cooling to 20°C said 13.6 grams of zinc oxide would be precipitated therefrom. There would thus be obtained a cycle of operations involving repeated use and recycling of an ammonium chloride solution which, at 90°C or higher would dissolve all of the zinc oxide from a suitably chosen weight of flue dust and which, upon cooling, would precipitate said zinc oxide as crystalline zinc oxide. In actual practice as hereinafter described, it was found that the temperature ranges differed from the theoretical figures.

It has been found that while a concentration of ammonium chloride solution below 30 percent will not dissolve the maximum amount of zinc oxide available in the flue dust to go into solution, a concentration of ammonium chloride greater than 30 percent will tend to precipitate out some ammonium chloride along with the zinc oxide when the solution is cooled. Therefore, 30 percent is the optimum or preferred ammonium chloride solution concentration.

Initially, an ammonium chloride solution (being saturated at room temperature with approximately 30 grams of ammonium chloride per 100 ml. of water) was heated to near boiling (approximately 100°C) and a suitable proportion of flue dust was stirred into it. The slurry thus formed was filtered while hot to remove the undissolved iron oxide. The resulting solution was quite blue, indicating the presence of copper as an impurity. In order to remove this impurity, the solution, while still hot, was treated with powdered zinc metal, causing the copper to be displaced from solution as metallic copper, and the zinc metal to enter solution as the zinc ion from which it would eventually be recovered as zinc oxide. The zinc metal also displaced the lead present in the solution and the lead precipitated out along with the copper. After the precipitation of the copper and the lead, the solution was again filtered to remove all the undissolved material and was allowed to cool so as to cause crystallization of the zinc oxide.

It was intended that the zinc oxide extraction could be conducted by adding together to the hot ammonium chloride solution the flue dust and a sufficient amount of zinc metal dust to displace the lead and the copper as metals. There would be no effort to recover the lead and copper or the insoluble iron oxide. The filtered decantate would contain only hot zinc oxide - ammonium chloride solution, from which the zinc oxide would crystallize upon cooling.

It was found, however, that ferric oxide contaminated the resultant zinc oxide crystals. This was the result of the following series of equations:

$$Zn^o + 2H^+ \rightarrow Zn^{++} + 2[H^o] \quad (1)$$
$$Zn^o + 2 NH_4^+ \rightarrow Zn^{++} + 2NH_3 + 2[H^o] \quad (2)$$
$$Fe^{+++} + [H^o] \rightarrow Fe^{++} + 40 H^+ \quad (3)$$
$$H^+ + NH_3 \rightarrow NH_4^+ \quad (4)$$
$$4FE^{++} + O_2^o + 8OH + 2H_2O \rightarrow 4Fe(OH)_3 \downarrow \quad (5)$$

Equations 1 and 2 show how either hydrogen ion or ammonium ion (from water or ammonium chloride) might react with metallic zinc to produce nascent (active, monoatomic) hydrogen. Equation 3 shows how this hydrogen reacts with the insoluble ferric (higher valence) ion to produce the soluble ferrous (lower valence) ion which goes into solution while Equation 4 shows the resultant hydrogen ion reacting with ammonia to reform the ammonium ion. Equation 5 shows how oxygen of the air converts the ferrous ion into reddish brown, insoluble ferric hydroxide.

Proof of this hypothesis was demonstrated by omitting the zinc dust from the initial addition of the flue dust to the hot ammonium chloride solution. The flue dust was digested in the solution, followed by settling and filtration. While the solution was sufficiently hot so that no crystallization occurred, zinc metal dust was added to displace the copper and the lead. These were separated from the solution by settling and filtration as a metallic mixture of lead and a trace of copper. The zinc oxide was then recovered by crystallization from the second filtrate. This procedure, in addition to providing lead and copper in recoverable form, yields a zinc oxide product which is entirely free of iron oxide.

A standard batch charge was prepared as follows:

| | |
|---|---|
| Gallons of solvent (2½ lbs. of ammonium chloride per gallon of water) | 60 |
| pounds of flue dust | 60 |
| pounds of zinc dust | 0.95 |

The charged solvent and flue dust entered a processor at about 60°C and was brought up to approximately 101.7°C over a period of 1½ hours with continual stirring. This is sufficient time to bring about complete dissolution of the zinc oxide.

The mixture was then dumped into a settling drum to permit settling of the iron oxide. The mixture was maintained at a high enough temperature to prevent crystallization of the zinc oxide. A settling time of 2¼ to 2½ hours is sufficient, after which time the copper and lead were precipitated from the solution by the addition of the zinc dust. The decantate was withdrawn from the settling drum and filtered into a crystallizing vat where it was cooled by evaporation. At the end of the cooling process, the crystals of zinc oxide were removed from the vat. The supernatant liquor was drained from the crystals leaving them essentially dry and free of solvent. The solvent was then pumped from the crystallizing vat back into the processor to be used again. The crystals were then washed, first with cool water, then with hot water.

The resulting crystals of zinc oxide are glassy, acicular or monoclinic crystals that range in size up to three-eights of an inch in length. The particle size distribution depends upon the method and rate of precipitation employed with the larger crystals being formed when the cooling process is maintained over a period of several hours. The crystals can grow up to one-eighth of an inch in cross-sectional dimension and up to one inch in length. If the cooling is rapid, the zinc oxide produced is in the form of fine, fluffy crystals. Thus, there is obtainable a variety of crystal sizes simply by the rate of cooling.

Analysis of the zinc oxide showed an ammonium chloride content occluded in the crystal of approximately 2 percent. Since the crystals are fairly friable, they can be easily ground to fine form. The resulting powder, when extracted with hot water, shows a chloride content of less than 0.2 percent. For most applications (paint pigment, rubber compounding, etc.), this level of ammonium chloride would not be objectionable; if the zinc oxide is to be used for the production of zinc chloride, a larger ammonium chloride content would be acceptable.

One of the novel features of the present invention resides in the use of an ammonium chloride solution as a thermal-differential-solubility extraction solvent. None of the materials mentioned in the previous extraction methods can be so employed and still avoid the disadvantages stated for their use.

It is obvious that one skilled in the art may make modifications in the details of the process without departing from the spirit of the invention which is set out in varying scope in the appended claims.

What is claimed is:

1. A method for the selective recovery of various components from electric furnace flue dust which contains the oxides of zinc, iron, lead and copper, comprising the steps of:
   a. treating said flue dust with an ammonium chloride solution maintained at an elevated temperature to form a solution comprising zinc chloride salt, a copper-ammonium complex, and lead chloride salt;
   b. separating said solution from the undissolved iron oxide;
   c. adding zinc metal to said solution whereby the copper and lead ions are displaced by said zinc and precipitate out of said solution as copper and lead metals; and,
   d. lowering the temperature of said solution whereby the zinc component is precipitated therefrom as zinc oxide.

2. A method as described in claim 1 wherein said elevated temperature of said ammonium chloride solution ranges from 90°C to 102°C.

3. A method as described in claim 1 wherein the concentration of said ammonium chloride solution is 30 percent by weight.

4. A method as described in claim 1 wherein said zinc metal is in powdered form.

5. A method as described in claim 1 wherein the temperature of said solution is lowered to at least 20°C to precipitate the zinc component therefrom.

6. A method as described in claim 1 further including the step of recycling said solution after said zinc oxide is precipated therefrom to be employed in step (a).

7. A method for the selective recovery of various components from electric furnace flue dust which contains the oxides of zinc, iron, lead and copper, comprising the steps of:
   a. treating said flue dust with an approximately 30 percent solution by weight of ammonium chloride maintained at a temperature ranging from 90°C to 102°C to form a solution comprising zinc chloride salt, a copper-ammonium complex, and lead chloride salt;
   b. separating said solution from the undissolved iron oxide;
   c. adding zinc metal to said solution whereby the copper and lead ions are displaced by said zinc and precipitate out of said solution as copper and lead metals; and,
   d. lowering the temperature of said solution whereby the zinc component is precipitated therefrom as zinc oxide.

8. A method as described in claim 7 wherein said zinc metal is in powdered form.

9. A method as described in claim 7 wherein the temperature of said solution is lowered to at least 20°C to precipitate the zinc component therefrom.

10. A method as described in claim 7 further including the step of recycling said solution after said zinc oxide is precipated therefrom to be employed in step (a).

* * * * *